US012266985B2

(12) United States Patent
Goykhman et al.

(10) Patent No.: US 12,266,985 B2
(45) Date of Patent: Apr. 1, 2025

(54) AXIAL FLUX MOTOR WITH COOLING JACKET

(71) Applicant: EATON INTELLIGENT POWER LIMITED, Dublin (IE)

(72) Inventors: Mikhail Goykhman, Reseda, CA (US); Galen Chui, Ladera Ranch, CA (US); Armen Baronian, Toronto (CA)

(73) Assignee: EATON INTELLIGENT POWER LIMITED, Dublin (IE)

( * ) Notice: Subject to any disclaimer, the term of this patent is extended or adjusted under 35 U.S.C. 154(b) by 207 days.

(21) Appl. No.: 17/783,913

(22) PCT Filed: Dec. 10, 2020

(86) PCT No.: PCT/EP2020/025570
§ 371 (c)(1),
(2) Date: Jun. 9, 2022

(87) PCT Pub. No.: WO2021/115632
PCT Pub. Date: Jun. 17, 2021

(65) Prior Publication Data
US 2023/0038386 A1     Feb. 9, 2023

Related U.S. Application Data

(60) Provisional application No. 62/946,172, filed on Dec. 10, 2019.

(51) Int. Cl.
*H02K 11/33*     (2016.01)
*H02K 5/20*     (2006.01)
(Continued)

(52) U.S. Cl.
CPC ............. *H02K 11/33* (2016.01); *H02K 5/203* (2021.01); *H02K 9/197* (2013.01); *H02K 9/223* (2021.01); *H02K 2213/12* (2013.01)

(58) Field of Classification Search
CPC ........ H02K 9/197; H02K 9/223; H02K 11/33; H02K 5/203; H02K 2213/12
(Continued)

(56) References Cited

U.S. PATENT DOCUMENTS 2,630,464 A    3/1953    Dunkelberger
4,710,667 A    12/1987    Whiteley
(Continued)

FOREIGN PATENT DOCUMENTS

CN     205407546 U     7/2016
CN     206759275 U     12/2017
(Continued)

OTHER PUBLICATIONS

International Search Report and Written Opinion of the International Searching Authority for International Patent Application No. PCT/EP2020/025570 mailed Apr. 9, 2021, 12 pages.
(Continued)

*Primary Examiner* — Alex W Mok
(74) *Attorney, Agent, or Firm* — Merchant & Gould P.C.

(57) ABSTRACT

A motor assembly can include a motor shaft, a stator assembly, and a rotor assembly, and can include a cooling jacket. The cooling jacket can include an inner wall facing radially inwardly towards the stator assembly and an opposite outer wall facing radially outwardly, a circumferential internal fluid passageway for allowing a cooling fluid to be pumped through an interior of the cooling jacket, the internal fluid passageway being disposed between the inner and outer walls and extending between an inlet and an outlet, a mounting pad receiving, at an opening in the outer wall, a heat generating component associated with the motor assembly, the opening being in fluid communication with the internal fluid passageway such that the cooling fluid can provide cooling to the heat generating component.

20 Claims, 17 Drawing Sheets

(51) Int. Cl.
*H02K 9/197* (2006.01)
*H02K 9/22* (2006.01)

(58) Field of Classification Search
USPC .......................................................... 310/71
See application file for complete search history.

(56) References Cited

U.S. PATENT DOCUMENTS

| | | | |
|---|---|---|---|
| 6,300,693 B1* | 10/2001 | Poag .................... | H02K 5/203 |
| | | | 310/58 |
| 6,768,932 B2 | 7/2004 | Claypole et al. | |
| 7,675,209 B2* | 3/2010 | Masoudipour ......... | H02K 5/203 |
| | | | 310/89 |
| 7,928,348 B2* | 4/2011 | Neal ...................... | H05B 6/108 |
| | | | 219/628 |
| 8,022,593 B2 | 9/2011 | Lamperth et al. | |
| 8,093,770 B1 | 1/2012 | Berhan | |
| 8,183,723 B2* | 5/2012 | Fee ........................ | H02K 5/203 |
| | | | 310/64 |
| 8,342,612 B2 | 1/2013 | Sgherri et al. | |
| 8,508,085 B2* | 8/2013 | Bradfield ................. | H02K 9/19 |
| | | | 310/52 |
| 8,629,585 B2* | 1/2014 | Bradfield ................. | H02K 9/19 |
| | | | 310/52 |
| 8,803,380 B2* | 8/2014 | Chamberlin ............. | H02K 9/19 |
| | | | 310/64 |
| 8,922,093 B2 | 12/2014 | Crocker | |
| 9,356,492 B2* | 5/2016 | Chamberlin ........... | H02K 5/203 |
| 9,525,325 B2* | 12/2016 | Chamberlin ........... | H02K 5/203 |
| 9,641,051 B2* | 5/2017 | Kalev .................... | H02K 7/025 |
| 9,917,486 B2* | 3/2018 | Kirkley, Jr. ............ | H02K 1/32 |
| 10,044,237 B2 | 8/2018 | Woolmer et al. | |
| 10,075,030 B2 | 9/2018 | Klassen | |
| 10,224,786 B2 | 3/2019 | Woolmer et al. | |
| 10,468,923 B2* | 11/2019 | Heilman ................. | H02K 1/20 |
| 2007/0013241 A1* | 1/2007 | Schiferl ................ | H02K 15/024 |
| | | | 310/58 |
| 2008/0093850 A1 | 4/2008 | Taneja et al. | |
| 2012/0132473 A1* | 5/2012 | Weber ................... | B60K 7/0007 |
| | | | 29/897 |
| 2012/0161554 A1 | 6/2012 | Ghelardi et al. | |
| 2013/0049495 A1 | 2/2013 | Matsuo | |
| 2013/0187492 A1 | 7/2013 | Woolmer | |
| 2014/0009025 A1 | 1/2014 | Hosek et al. | |
| 2014/0015351 A1 | 1/2014 | Marvin et al. | |
| 2014/0091650 A1 | 4/2014 | Lenschow | |
| 2014/0300220 A1 | 10/2014 | Marvin | |
| 2014/0354089 A1* | 12/2014 | Chamberlin ........... | H02K 5/203 |
| | | | 310/54 |
| 2014/0354090 A1* | 12/2014 | Chamberlin ........... | H02K 5/203 |
| | | | 310/54 |
| 2015/0030479 A1 | 1/2015 | Müller | |
| 2016/0164377 A1 | 6/2016 | Gauthier et al. | |
| 2016/0226327 A1 | 8/2016 | Rippel et al. | |
| 2016/0329796 A1 | 11/2016 | Hano et al. | |
| 2017/0012480 A1 | 1/2017 | Woolmer | |
| 2017/0025927 A1 | 1/2017 | Weerts et al. | |
| 2017/0063182 A1* | 3/2017 | Heilman ................ | H02K 5/203 |
| 2018/0054094 A1 | 2/2018 | Dlala et al. | |
| 2018/0305036 A1 | 10/2018 | Vondrell et al. | |
| 2019/0181717 A1 | 6/2019 | Zhou et al. | |
| 2019/0288584 A1 | 9/2019 | Vansompel et al. | |
| 2019/0379257 A1 | 12/2019 | Gerstler et al. | |
| 2019/0383292 A1 | 12/2019 | Kreidler et al. | |
| 2020/0003215 A1 | 1/2020 | Geue et al. | |
| 2022/0393527 A1 | 12/2022 | Goykhman et al. | |
| 2022/0393543 A1 | 12/2022 | Goykhman et al. | |
| 2022/0399791 A1 | 12/2022 | Goykhman et al. | |
| 2022/0416613 A1 | 12/2022 | Goykhman et al. | |
| 2023/0082277 A1 | 3/2023 | Goykhman et al. | |

FOREIGN PATENT DOCUMENTS

| | | |
|---|---|---|
| CN | 109474114 A | 3/2019 |
| CN | 109478808 A | 3/2019 |
| DE | 101 40 362 A1 | 3/2003 |
| DE | 10 2014 221 648 A1 | 4/2016 |
| EP | 1 045 505 A2 | 10/2000 |
| EP | 2 109 208 A1 | 10/2009 |
| EP | 2 224 577 A1 | 9/2010 |
| EP | 3 028 888 A1 | 6/2016 |
| EP | 3 079 239 A1 | 10/2016 |
| EP | 3 460 958 A1 | 3/2019 |
| EP | 3 338 345 B1 | 6/2019 |
| GB | 974730 A | 11/1964 |
| GB | 2 538 526 A | 11/2016 |
| JP | 2004-208461 A | 7/2004 |
| JP | 2006-14564 A | 1/2006 |
| JP | 2006-33965 A | 2/2006 |
| JP | 2006-50752 A | 2/2006 |
| JP | 2009-050066 A | 3/2009 |
| JP | 2013-121226 A | 6/2013 |
| WO | 2009/025076 A1 | 2/2009 |
| WO | 2010/092403 A2 | 8/2010 |
| WO | 2018/015293 A1 | 1/2018 |
| WO | 2019/171318 A1 | 9/2019 |
| WO | 2021/089188 A1 | 5/2021 |
| WO | 2021/089189 A1 | 5/2021 |
| WO | 2021/115632 A1 | 6/2021 |

OTHER PUBLICATIONS

International Search Report and Written Opinion of the International Searching Authority for International Patent Application No. PCT/EP2020/025497 mailed Feb. 8, 2021, 17 pages.
International Search Report and Written Opinion of the International Searching Authority for International Patent Application No. PCT/EP2020/025498 mailed Feb. 8, 2021, 15 pages.
International Search Report and Written Opinion of the International Searching Authority for International Patent Application No. PCT/EP2020/025500 mailed Feb. 10, 2021, 12 pages.
International Search Report and Written Opinion of the International Searching Authority for International Patent Application No. PCT/EP2021/025064 mailed May 20, 2021, 14 pages.
International Search Report and Written Opinion of the International Searching Authority for International Patent Application No. PCT/EP2021/025065 mailed May 27, 2021, 14 pages.
International Search Report and Written Opinion of the International Searching Authority for International Patent Application No. PCT/EP2021/025066 mailed May 27, 2021, 12 pages.
International Search Report and Written Opinion of the International Searching Authority for International Patent Application No. PCT/EP2021/025067 mailed May 28, 2021, 13 pages.

* cited by examiner

AXIAL FLUX MOTOR WITH COOLING JACKET

CROSS-REFERENCE TO RELATED APPLICATION

This application is a National Stage Application of PCT/EP2020/025570, filed on Dec. 10, 2020, which claims the benefit of U.S. Patent Application Ser. No. 62/946,172, filed on Dec. 10, 2019, the disclosures of which are incorporated herein by reference in their entireties. To the extent appropriate, a claim of priority is made to each of the above disclosed applications.

TECHNICAL FIELD

The present disclosure relates generally axial flux motors.

BACKGROUND

Electrically powered aircraft are increasingly becoming more relevant in the aerospace industry. The ability to optimize power density is an important factor relating to the successful widespread use of electrically powered aircraft. Heat extraction and loss reduction are significant considerations impacting the optimization of power density.

SUMMARY

An electric motor assembly can include a motor shaft, a stator assembly, and a rotor assembly, and can include a cooling jacket. The cooling jacket can include an inner wall facing radially inwardly towards the stator assembly and an opposite outer wall facing radially outwardly, a circumferential internal fluid passageway for allowing a cooling fluid to be pumped through an interior of the cooling jacket, the internal fluid passageway being disposed between the inner and outer walls and extending between an inlet and an outlet, a mounting pad receiving, at an opening in the outer wall, a heat generating component associated with the motor assembly, the opening being in fluid communication with the internal fluid passageway such that the cooling fluid can provide cooling to the heat generating component.

In some examples, the mounting pad includes a plurality of mounting pads, each receiving a heat generating component.

In some examples, the heat generating component is a power electronics module.

In some examples, the mounting pad includes a top wall and a perimeter wall extending from the top wall and to the internal fluid passageway.

In some examples, the perimeter wall is generally rectangular shaped.

In some examples, the perimeter wall has long sides running parallel to a top and a bottom side of the cooling jacket and short sides running orthogonal to the long sides.

In some examples, the mounting pad includes a plurality of mounting pads arranged such that the short end of the perimeter wall of one mounting pad is proximate the short end of the perimeter wall of another mounting pad.

A cooling jacket for cooling a stator assembly of a motor assembly and at least one other heat generating component of a motor assembly can include an inner wall configured to face radially inwardly towards the stator assembly and an opposite outer wall facing radially outwardly, a circumferential internal fluid passageway for allowing a cooling fluid to be pumped through an interior of the cooling jacket, the internal fluid passageway being disposed between the inner and outer walls and extending between an inlet and an outlet, and a mounting pad configured for receiving, at an opening in the outer wall, the heat generating component, the opening being in fluid communication with the internal fluid passageway such that the cooling fluid can provide cooling to the heat generating component.

In some examples, the mounting pad includes a plurality of mounting pads, each configured for receiving a heat generating component.

In some examples, the mounting pad includes a top wall and a perimeter wall extending from the top wall and to the internal fluid passageway.

In some examples, the perimeter wall is generally rectangular shaped.

In some examples, the perimeter wall has long sides running parallel to a top and a bottom side of the cooling jacket and short sides running orthogonal to the long sides.

An electric motor assembly can include a motor shaft, a stator assembly, and a rotor assembly; and a cooling structure surrounding the stator assembly and retaining a cooling fluid in thermal communication with the stator assembly; the cooling structure including an outer wall and a mounting pad receiving, at an opening in the outer wall, a heat generating component associated with the motor assembly, the opening being in direct fluid communication with the cooling fluid such that the cooling fluid can provide cooling to the heat generating component.

In some examples, the stator assembly is a flooded stator assembly such that the cooling fluid is in direct contact with the stator assembly.

In some examples, the mounting pad includes a plurality of mounting pads, each configured for receiving a heat generating component.

In some examples, the mounting pad includes a top wall and a perimeter wall extending from the top wall and to the internal fluid passageway.

In some examples, the cooling structure is a cooling jacket including an inner wall facing radially inwardly towards the stator assembly and an opposite outer wall facing radially outwardly; and a circumferential internal fluid passageway for allowing a cooling fluid to be pumped through an interior of the cooling jacket, the internal fluid passageway being disposed between the inner and outer walls and extending between an inlet and an outlet; wherein the mounting pad opening is in fluid communication with the circumferential internal fluid passageway.

In some examples, the heat generating component is a power electronics module.

In some examples, the electric motor assembly is an axial flux electric motor assembly.

In some examples, the power electronics module includes cooling fins.

In some examples, the power electronics module cooling fins extend into the interior volume defined by the mounting pad.

A variety of additional aspects will be set forth in the description that follows. The aspects relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
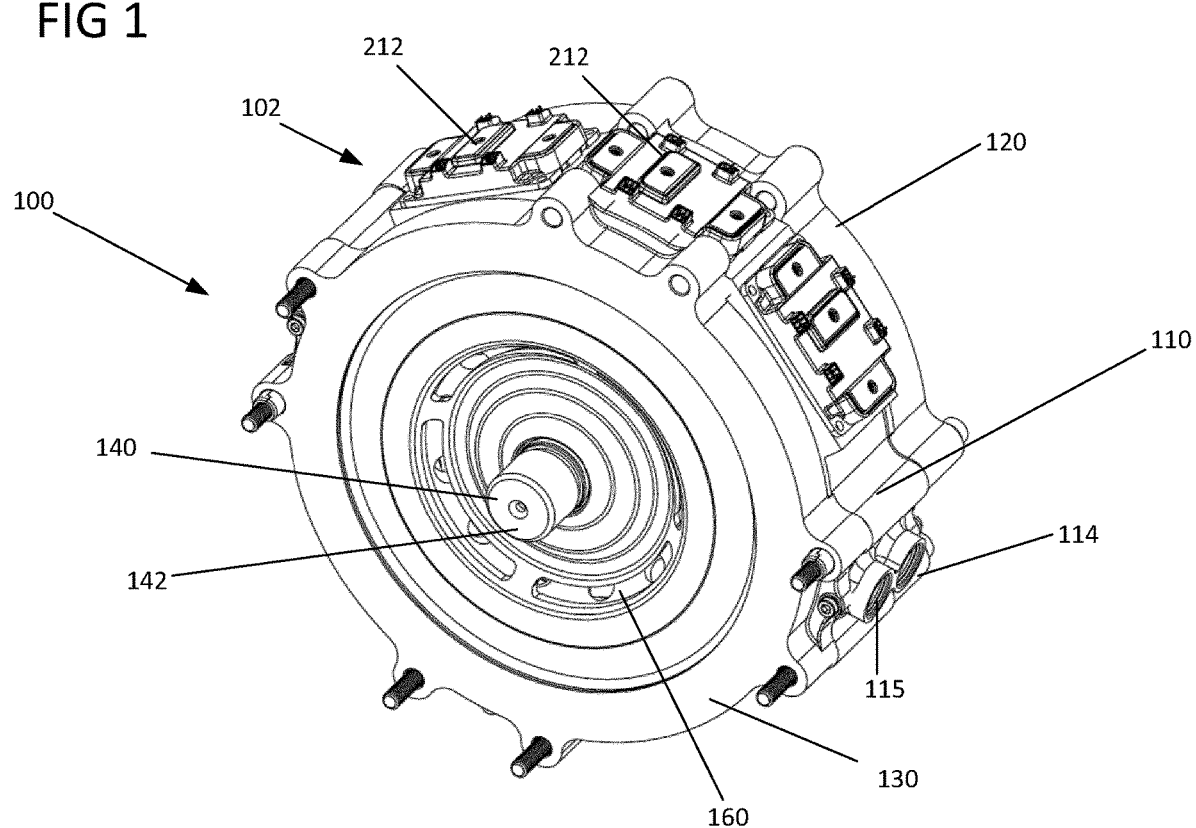
FIG. 1 is a first perspective view of an example axial flux motor in accordance with the present disclosure.
Figure 2:
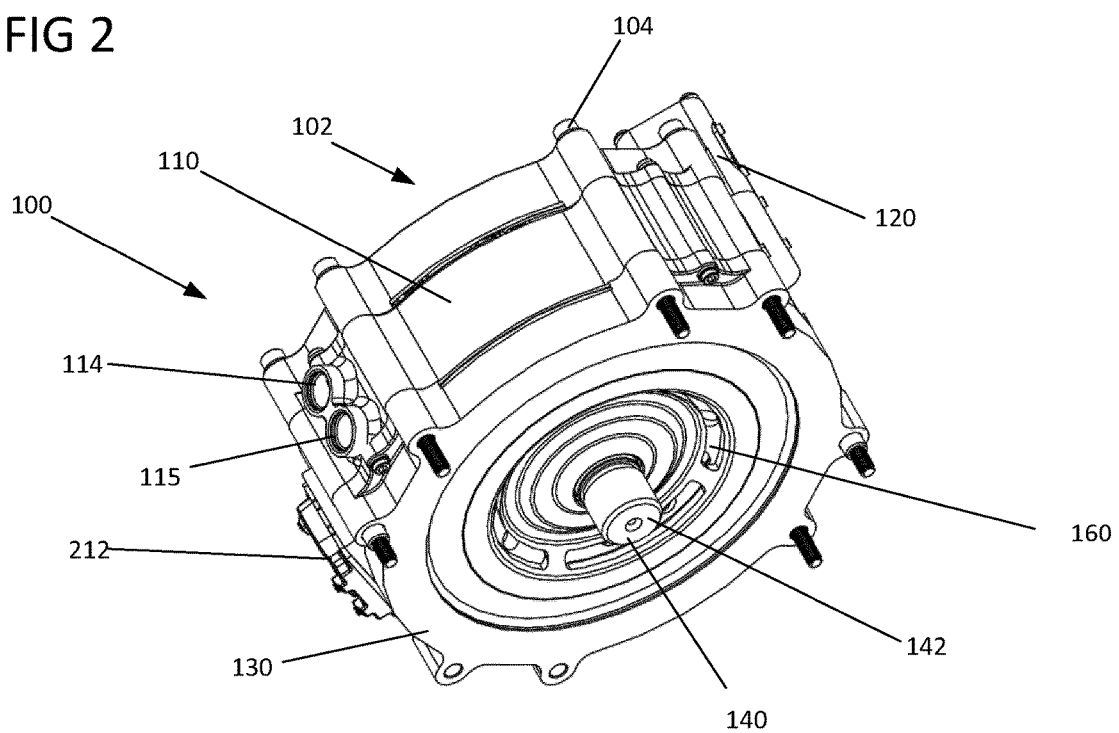
FIG. 2 is a second perspective view of the axial flux motor of FIG. 1.
Figure 3:
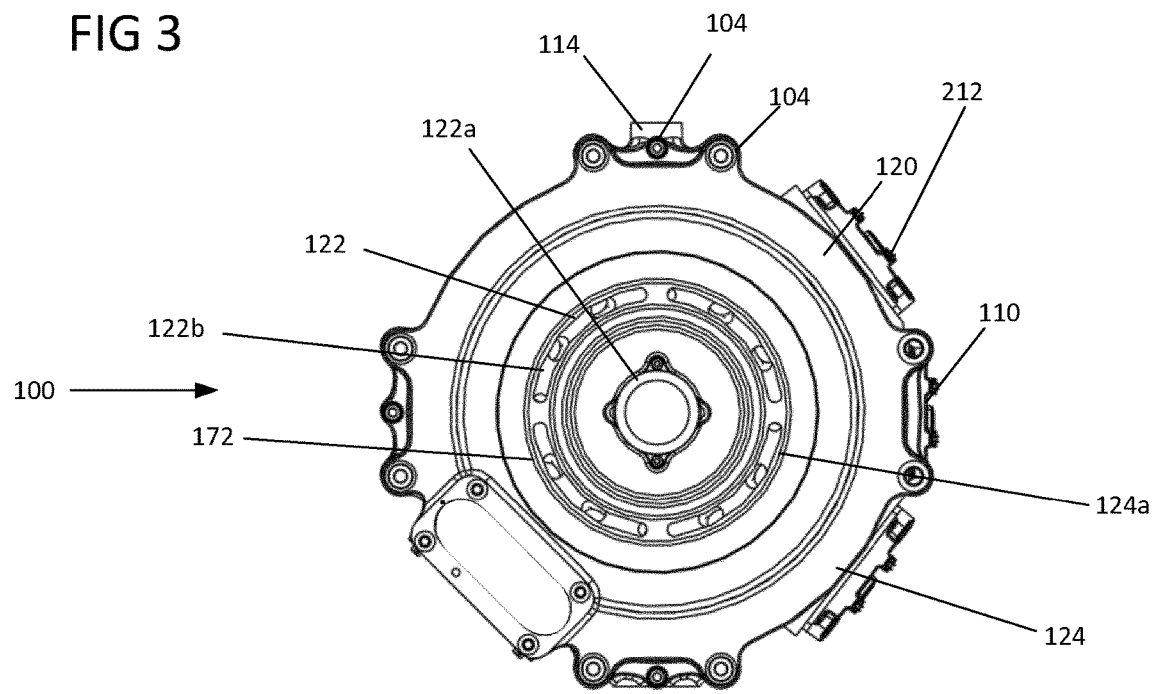
FIG. 3 is a first end view of the axial flux motor of FIG. 1.
Figure 4:
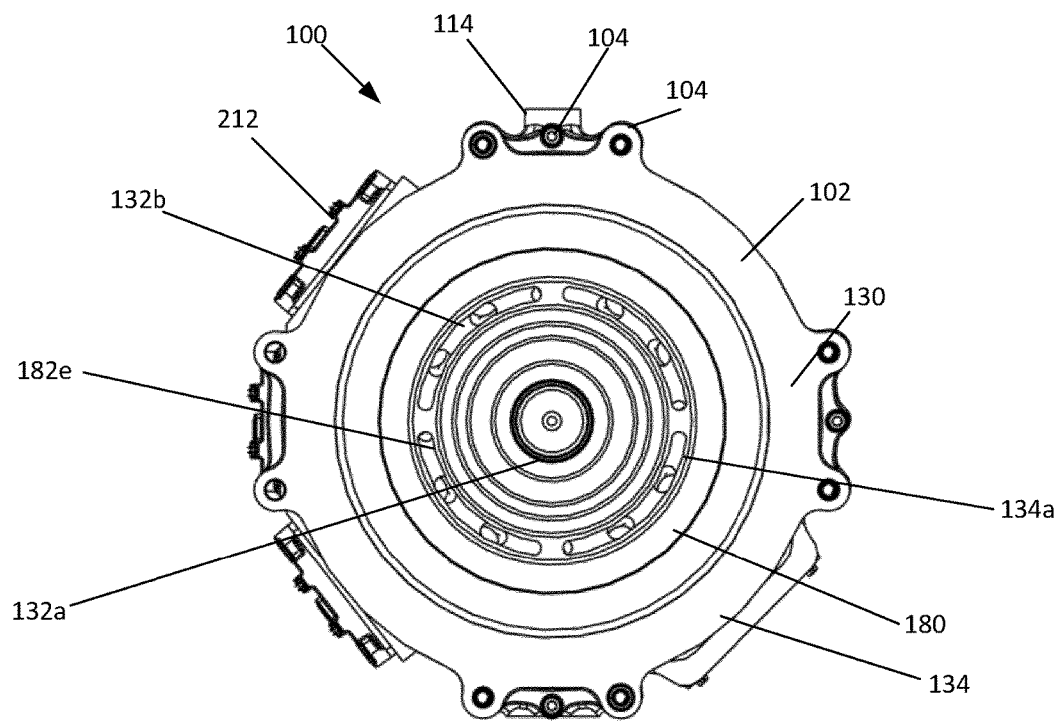
FIG. 4 is a second end view of the axial flux motor of FIG. 1.
Figure 5:
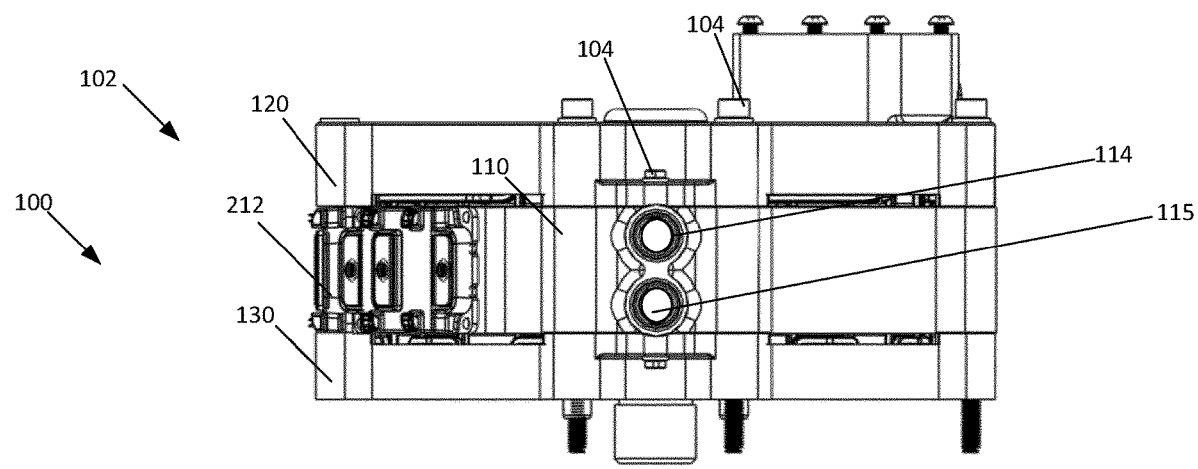
FIG. 5 is a first side view of the axial flux motor of FIG. 1.
Figure 6:
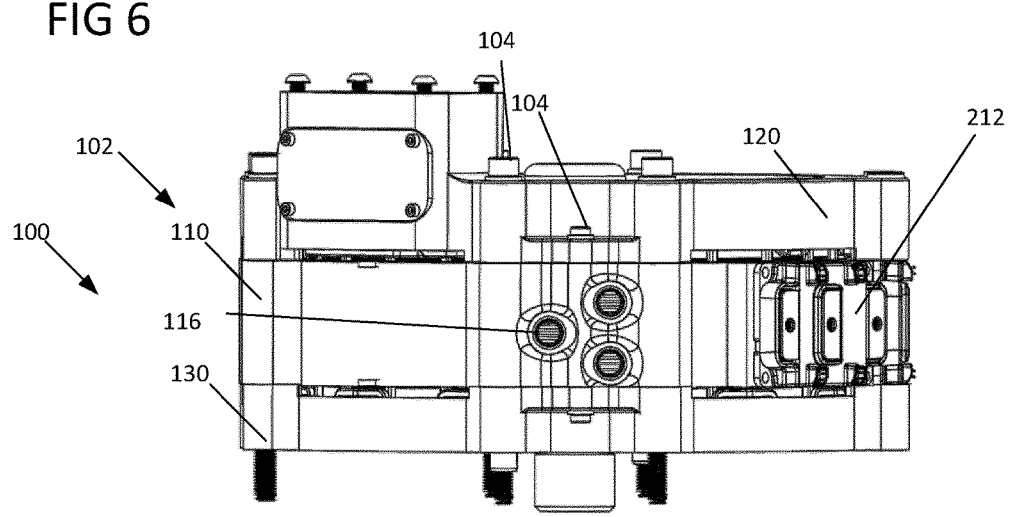
FIG. 6 is a second side view of the axial flux motor of FIG. 1.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

General Construction

FIGS. 1 to 10 show an axial flux electric motor 100 in accordance with the principles of the present disclosure. In one aspect, the motor 100 includes a housing assembly 102 for housing the stator assembly 150 and the rotor assembly 160 of the motor 100. The motor 100 is oriented about a longitudinal axis X.

As shown, the housing assembly 102 includes a first housing part 110, a second housing part 120, and a third housing part 130 cooperatively define the housing assembly 102. Fasteners 104, for example threaded bolts or screws, are provided to secure the housing parts 110, 120, 130 together. Although the drawings do not show retainers or nuts provided in association with the fasteners 104, a skilled person will understand that one or both of the housing parts 120, 130 can be provided with correspondingly threaded openings and/or that separate retainers, such as nuts, can be provided. The first housing part 110 is shown in isolation at FIGS. 11 to 18. The first housing part 110 supports the stator assembly 150 while the second housing part 120 encloses one side of the rotor assembly 160 with the third housing part 130 enclosing an opposite side of the rotor assembly 160. In one aspect the second and third housing parts 120, 130 include end walls 122, 132 defining central apertures 122a, 132a and a plurality of air intake apertures 122b, 132b arranged as arc-shaped segments circumferentially arranged about the central apertures 122a, 132a. The second and third housing parts 120, 130 are further provided with circumferential outer walls 124, 134. In one aspect, the circumferential outer walls 124, 134 include notches or openings 124a, 134a that enable airflow into and out of the housing assembly 102. In the example presented herein, the notches or openings 124a, 134a form an enclosed opening with an end portion of the first housing part 110. However, alternate arrangements are possible. For example, enclosed openings could be wholly formed in the second and third housing parts 120, 130. Various features of the housing parts 110, 120, 130 are discussed in further detail in later sections.

The stator assembly 150, shown in FIGS. 7 to 10 includes a plurality of electromagnets 152 spaced circumferentially about the axis of rotation X. The electromagnets 152 each include a stator core 154 about which a wire coil 156 (e.g., a copper winding) is wound. In operation, electromagnets define opposite magnetic poles at the ends of the stator cores 154 when an electrical current is applied to the wire coils 156 via a power connection interface. In one aspect, the stator assembly 150 can be provided with a stator assembly body 158 securing the components of the stator assembly 150 together. In the example shown, the stator body 158 can be an epoxy or potting material applied after the stator assembly 150 is mounted within the first housing part 154 and the bearing assembly sleeve 192 such that the stator assembly 150 is in direct thermal contact with the housing part 120. In one aspect, the stator body 158 supports the sleeve 192 of the bearing assembly 190. In some examples, the material of the stator body 158 has a high coefficient of thermal conductivity such that heat can be transferred from the stator assembly 150 to the housing part 120. For example, the stator body 158 can be formed form a thermally conductive epoxy material or thermoplastic material. The stator assembly 150 can also be provided with end rings 159a, 159b bridging between the sleeve 192 and the first housing part 120 to secure the axial ends of the stator body 158 and to impart structural integrity to the stator assembly 150.

Figure 7:
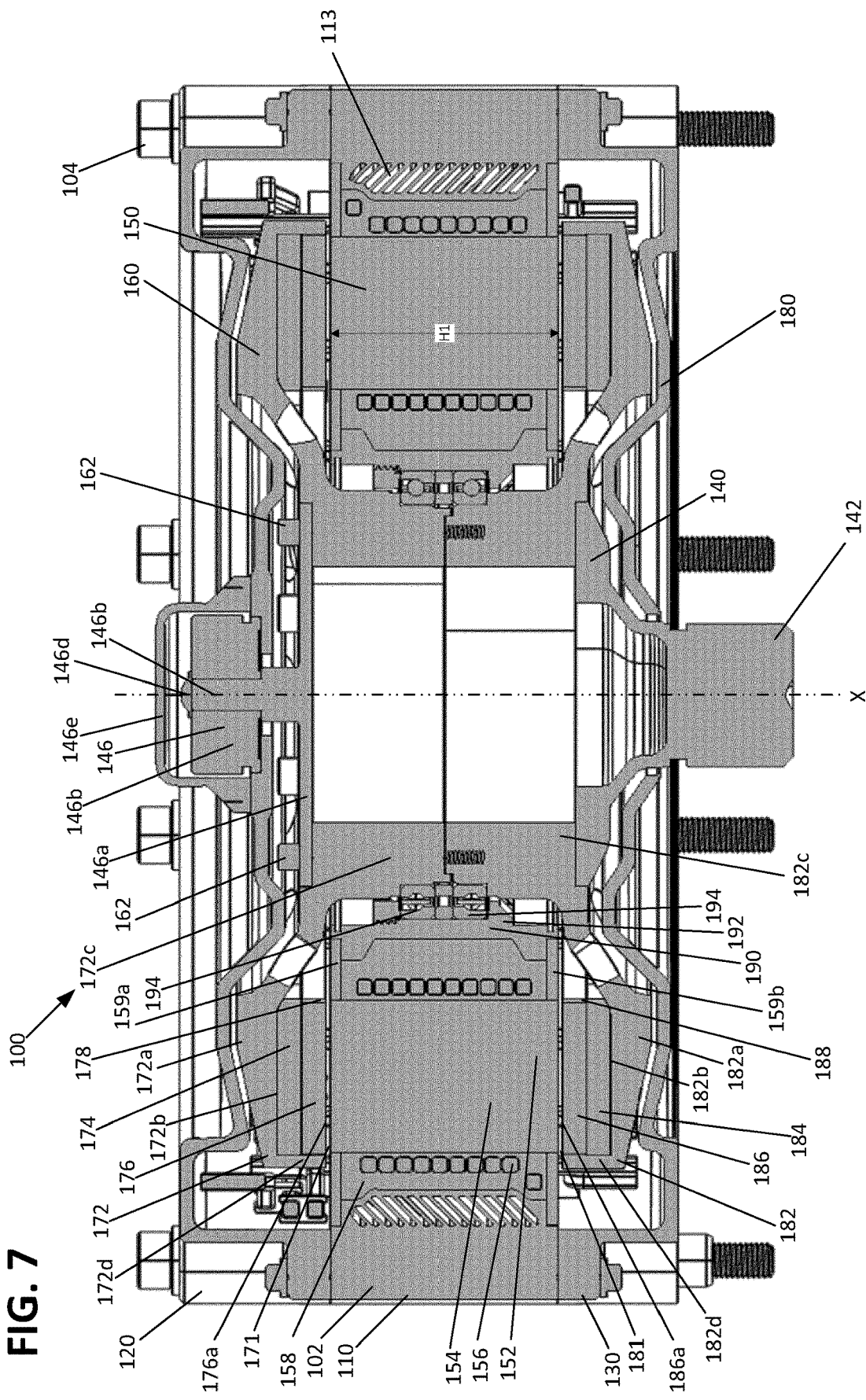
FIG. 7 is a cross-sectional side view of the axial flux motor of FIG. 1.
Figure 8:
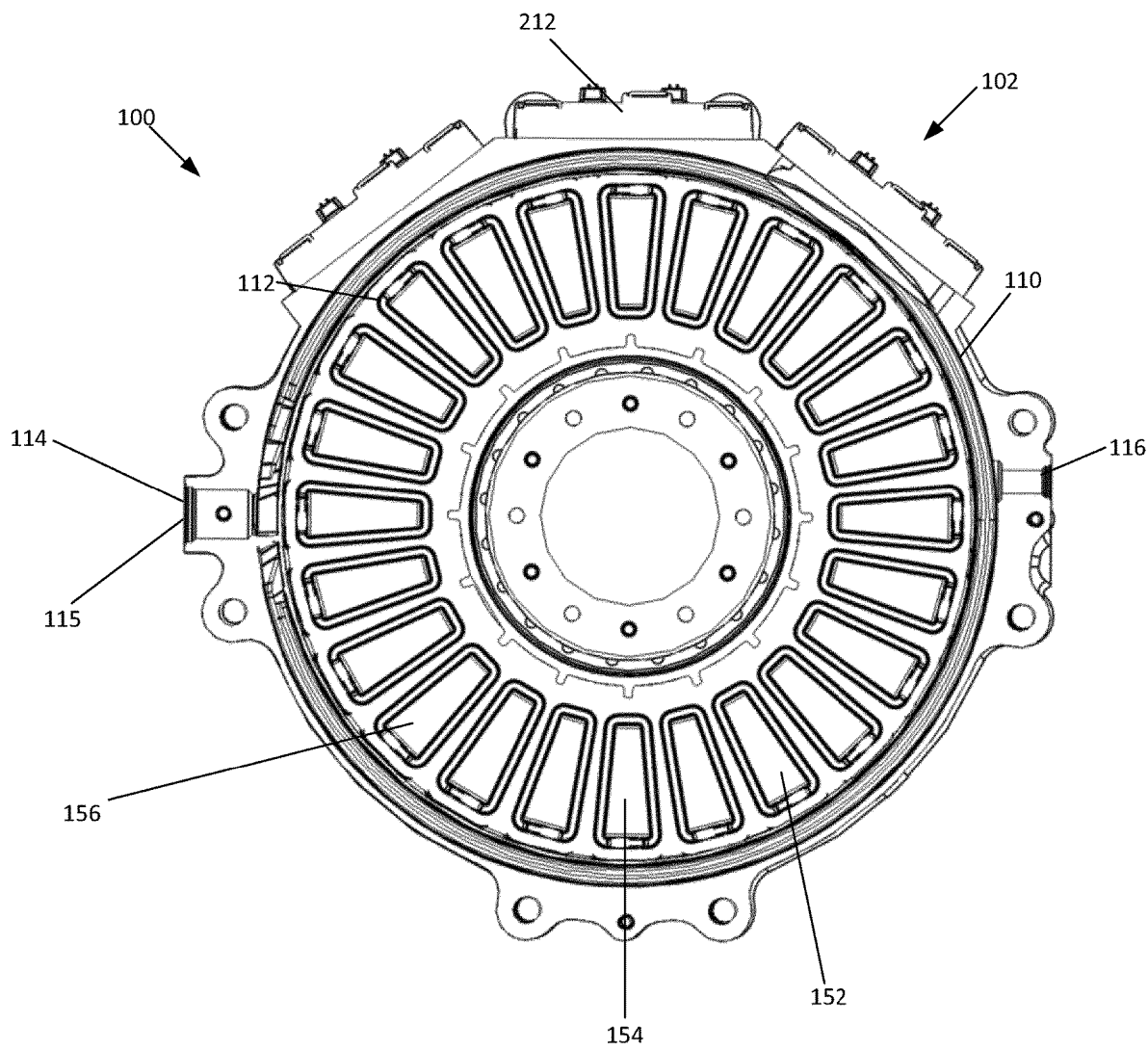
FIG. 8 is a cross-sectional end view of the axial flux motor of FIG. 1.
Figure 9:
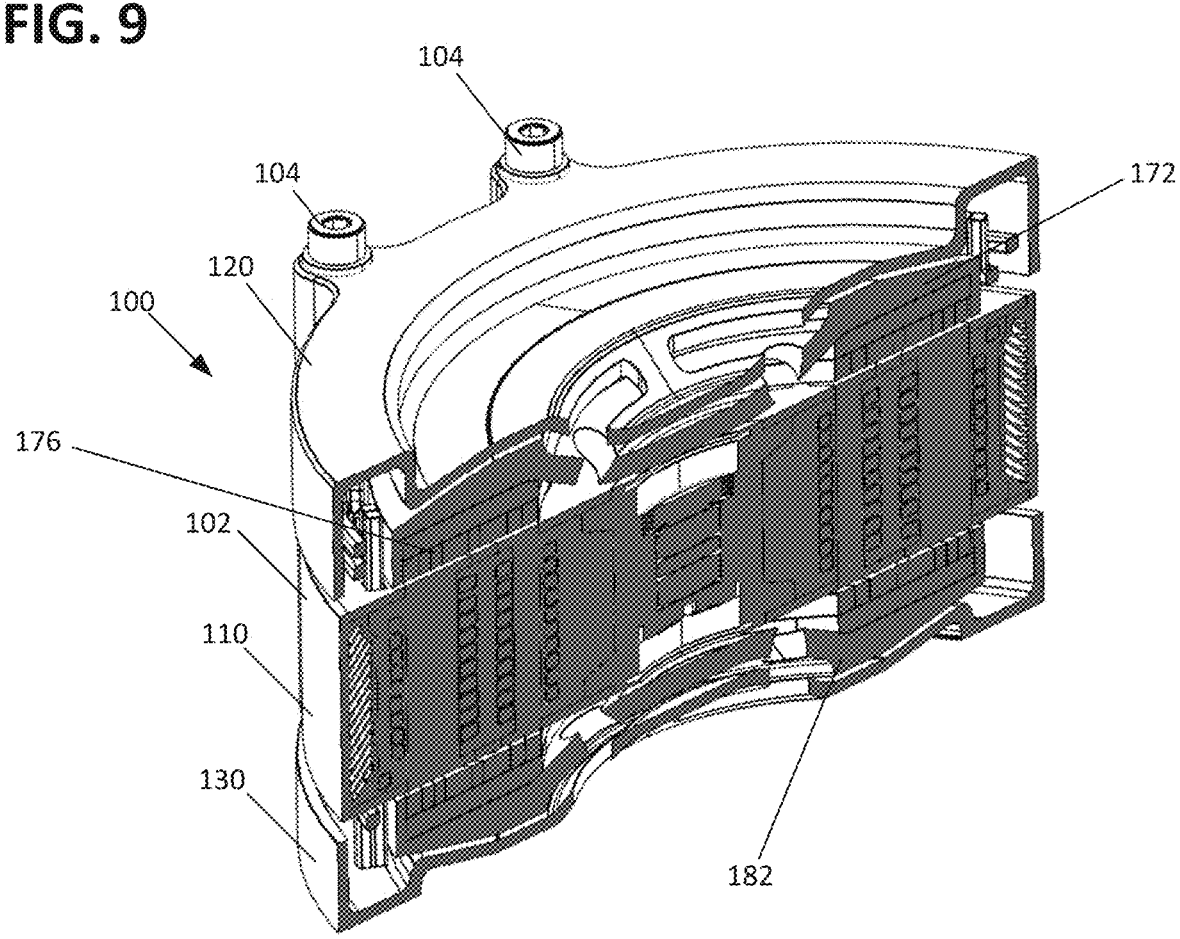
FIG. 9 is a cross-sectional side perspective view of the axial flux motor of FIG. 1.
Figure 10:
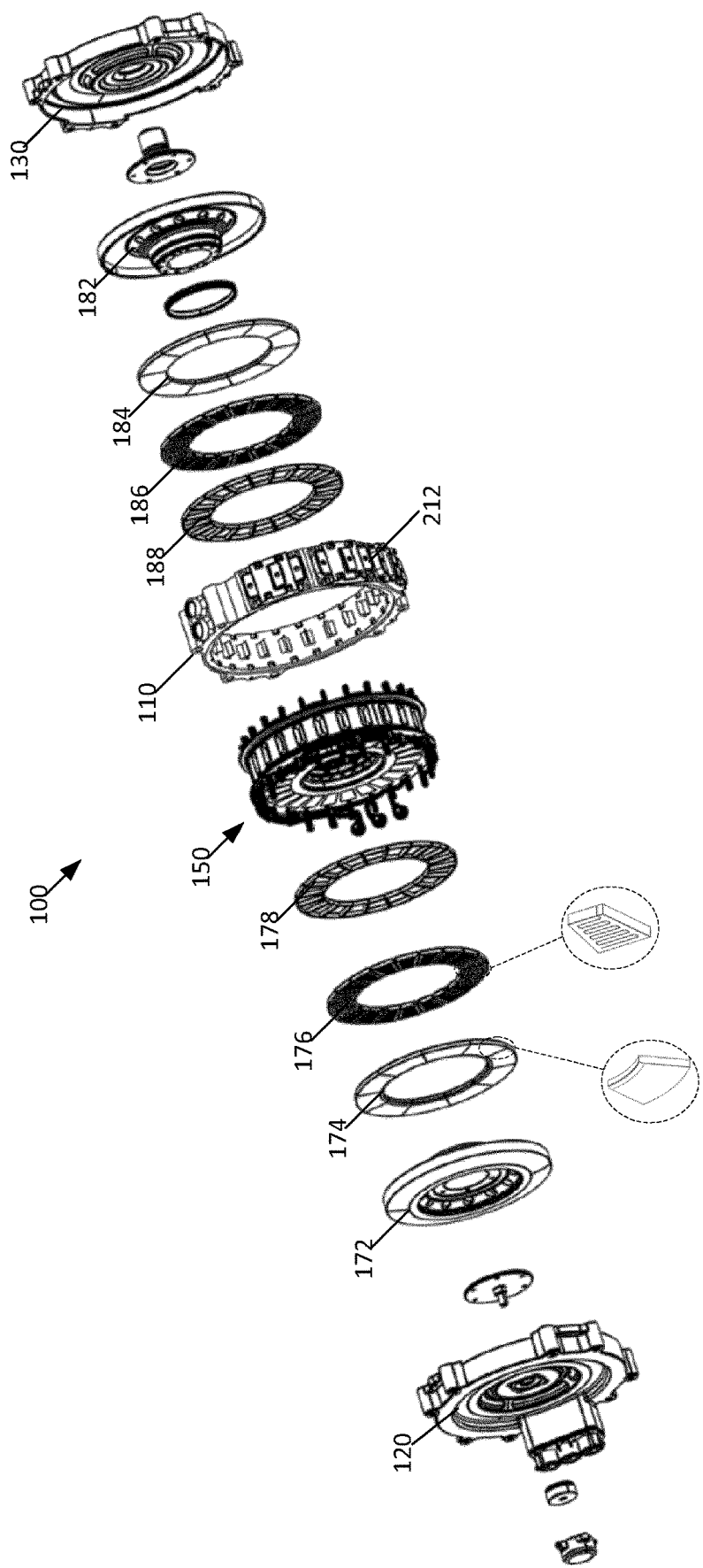
FIG. 10 is a perspective exploded view of the axial flux motor of FIG. 1.
Figure 11:
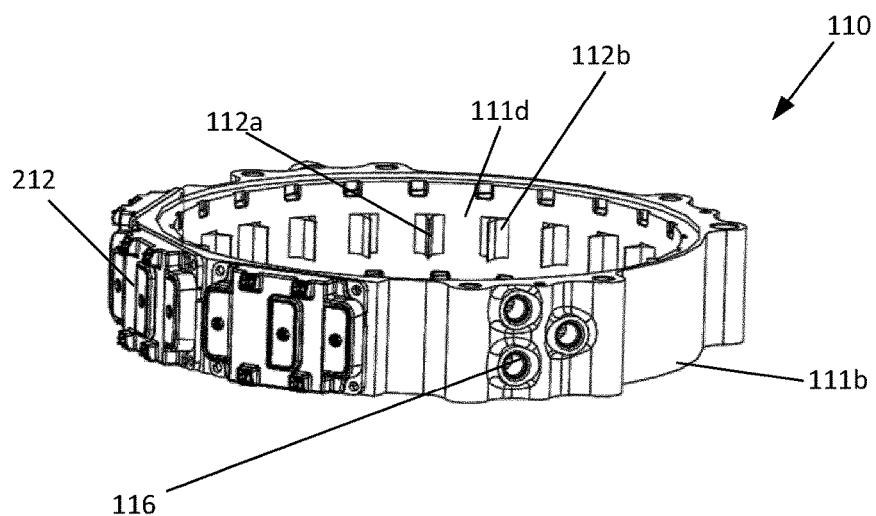
FIG. 11 is a first perspective view of a first housing part of the axial flux motor of FIG. 1, the first housing part including a cooling jacket.
Figure 12:
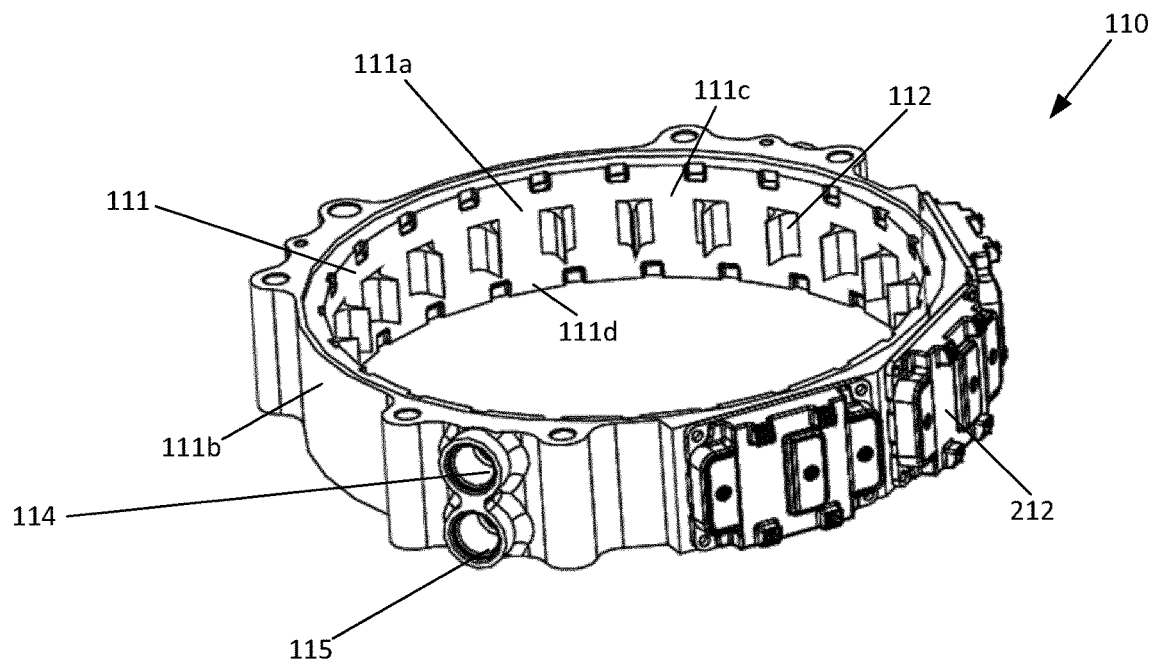
FIG. 12 is a second perspective view of the first housing part of FIG. 11.
Figure 13:
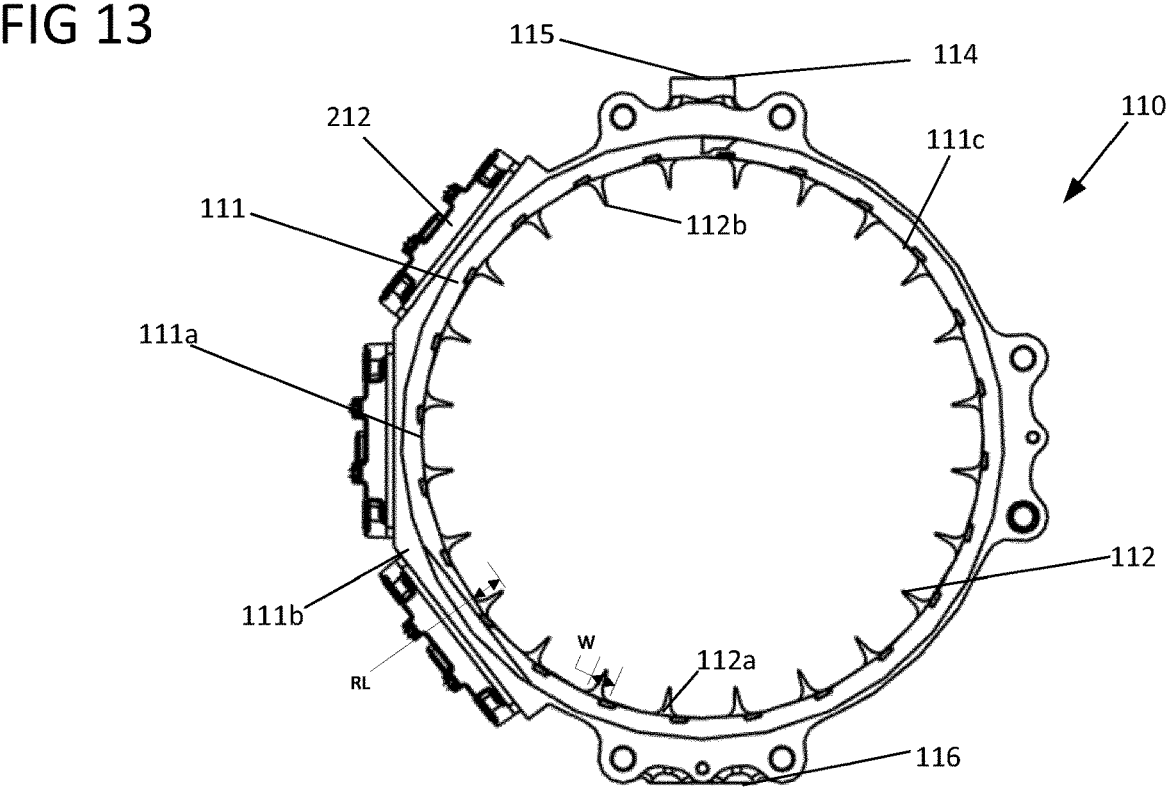
FIG. 13 is a first end view of the first housing part of FIG. 11.
Figure 14:
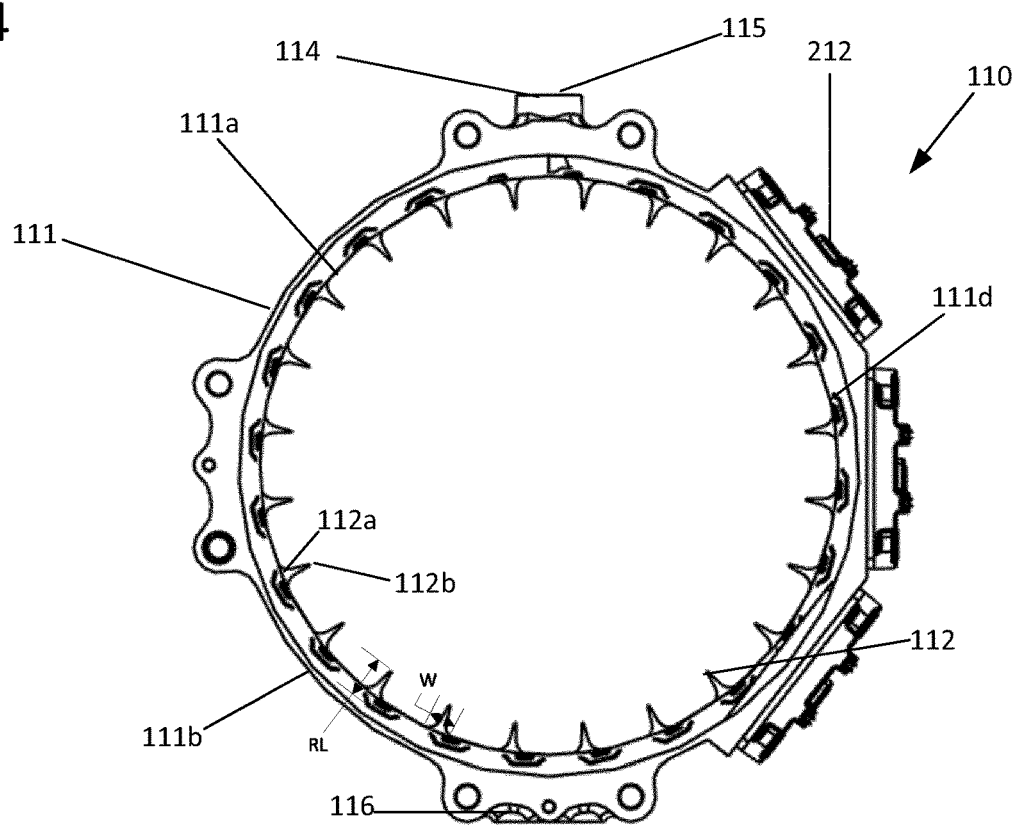
FIG. 14 is a second view of the first housing part of FIG. 11.
Figure 15:
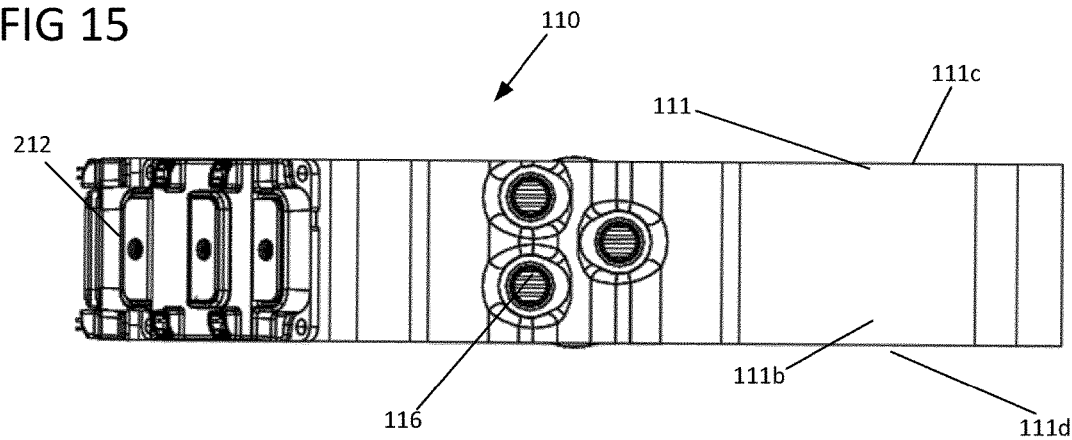
FIG. 15 is a first side view of the first housing part of FIG. 11.
Figure 16:
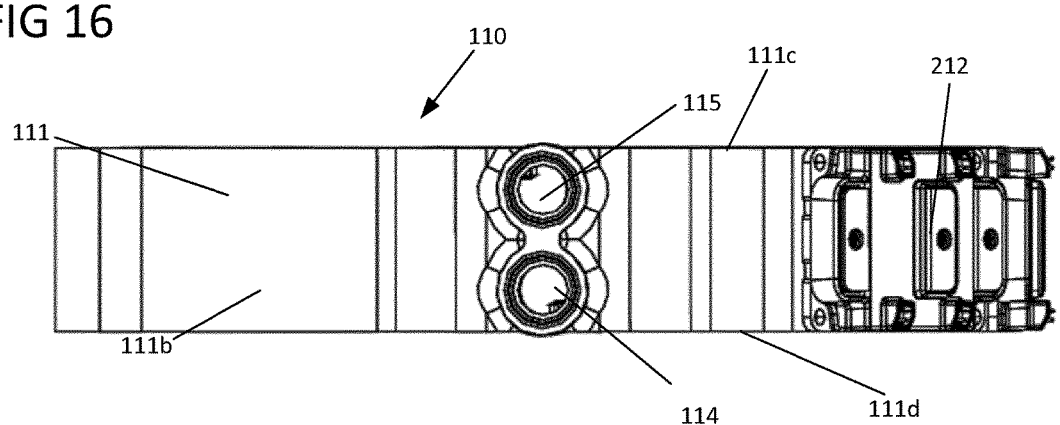
FIG. 16 is a second side view of the first housing part of FIG. 11.
Figure 17:
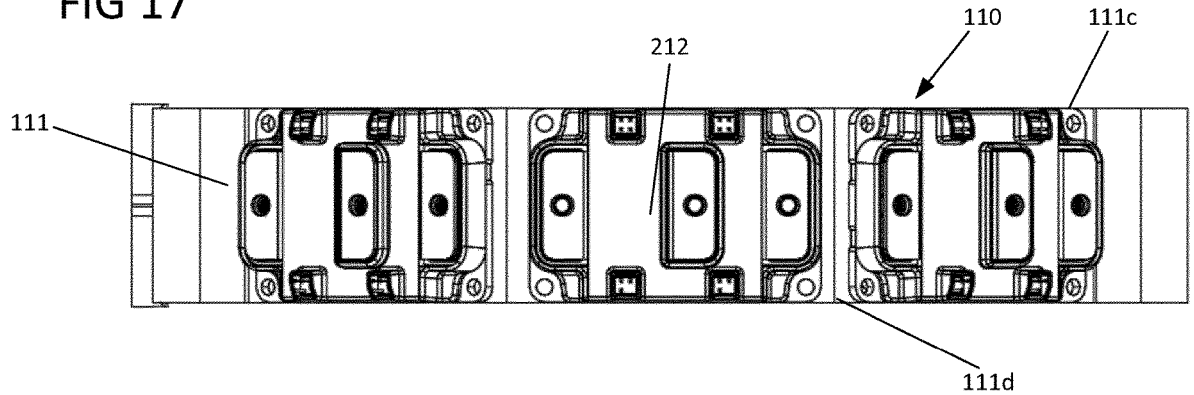
FIG. 17 is a third side view of the first housing part of FIG. 11.
Figure 18:
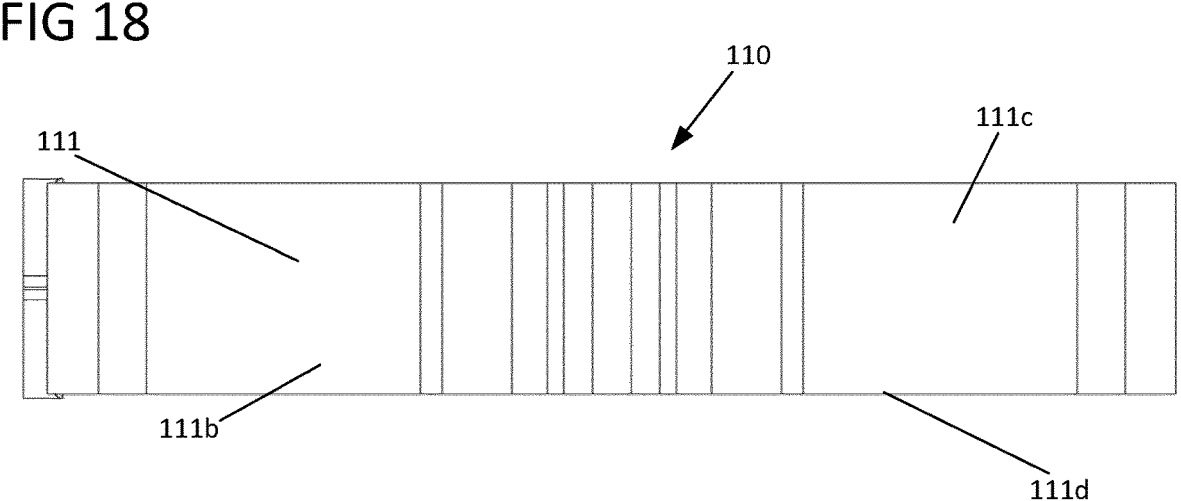
FIG. 18 is a fourth side view of the first housing part of FIG. 11.
Figure 19:
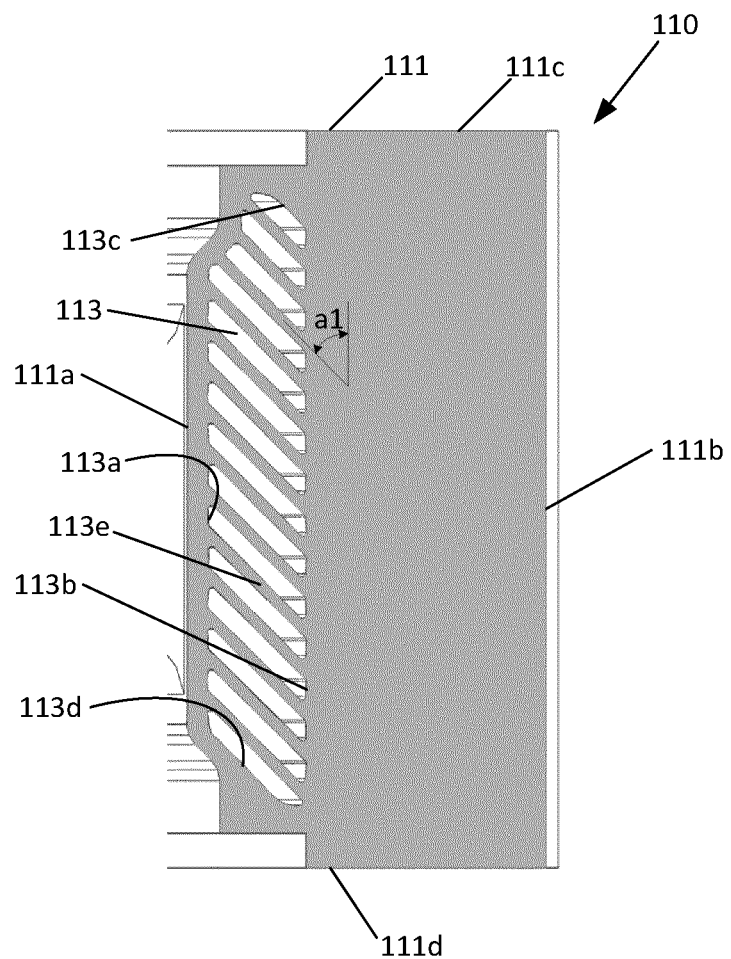
FIG. 19 is cross-sectional side view of a first portion of the first housing part of FIG. 11, showing a portion of the internal cooling passageway.
Figure 20:
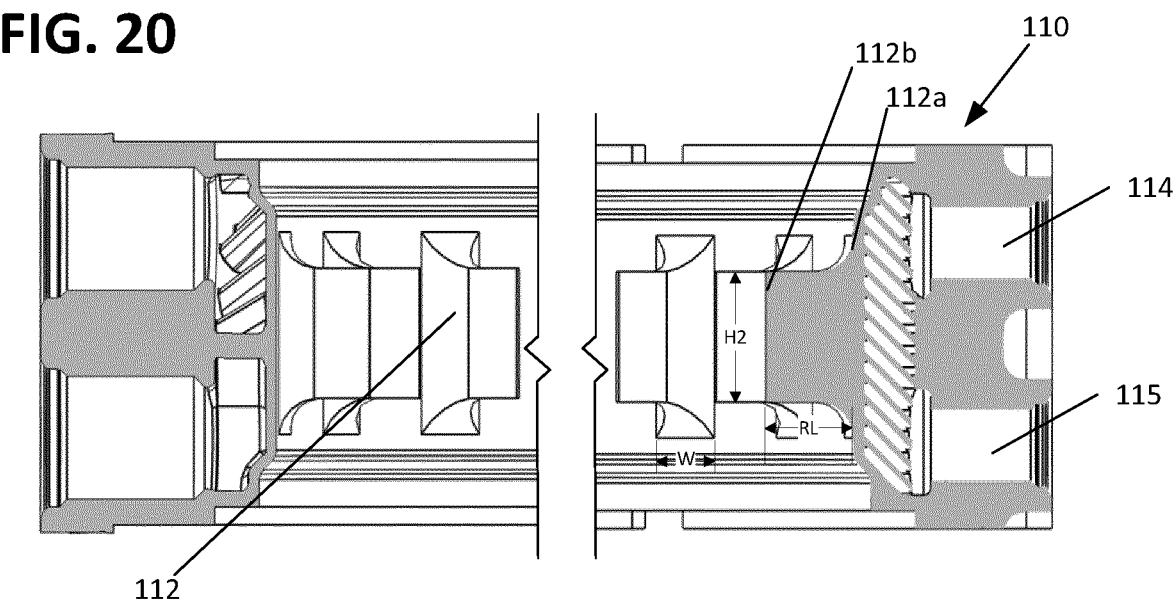
FIG. 20 is cross-sectional side view of the first housing part of FIG. 11, showing portions of the internal cooling passageway.
Figure 21:
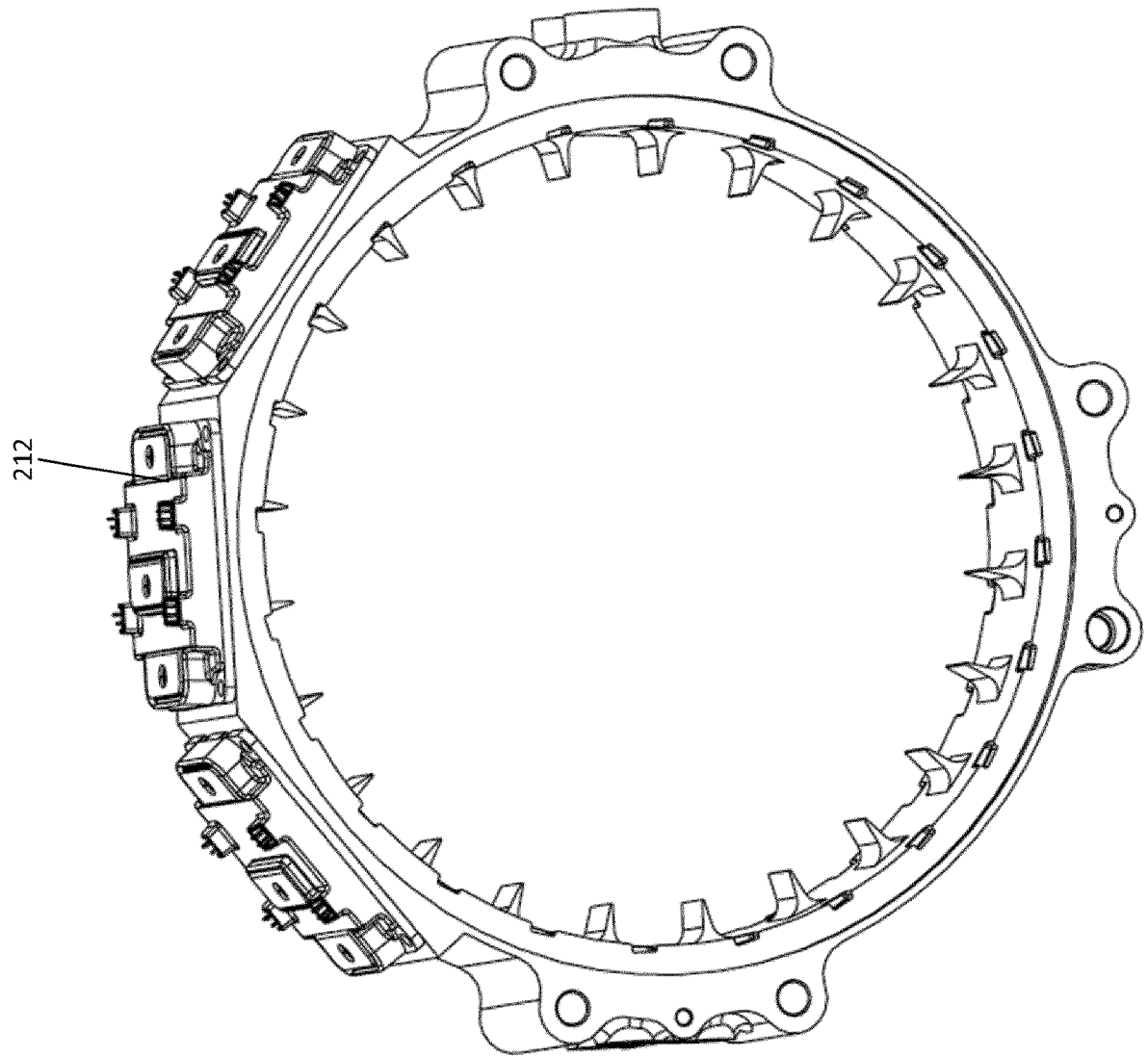
FIG. 21 is a fifth view of the first housing part of FIG. 11 highlighting power electronics modules.

As most easily see in the cross-sectional view provided at FIGS. 7, a bearing assembly 190, located between the stator assembly 150 and the rotor assembly 160, is provided to facilitate rotation of the rotor assembly 160 relative to the stator assembly 150. As most easily viewed at FIG. 7, the bearing assembly 190 includes a sleeve 192 secured to the stator assembly 150 and supporting a pair of bearings 194.

With continued reference to FIG. 7, the rotor assembly 160 includes a first rotor subassembly 170 and a second rotor subassembly 180 that connect to each other and sandwich the stator assembly 150. In one aspect, the first and second rotor subassemblies 170, 180 include a first rotor part 172 and a second rotor part 182, respectively. The rotor parts 172, 182 define, in part, an end wall 172a defining an interior end face 172b, 182b, a hub portion 172c, 182c, and a circumferential outer wall 172d, 182d. The first and second rotor subassemblies 170, 180 further include a segmented back iron or yoke ring 174, 184 mounted to the end faces 172b, 182b of the rotor parts 172, 182 to which permanent magnets 176, 186 are mounted. Potting material 178, 188, such as an epoxy material, can be provided to bond the permanent magnets 176, 186 in place to the back iron or yoke ring 174, 184. In one aspect, the first and second rotor parts 172, 182 are coupled together at the hub portions 172c, 182c, for example by fasteners 162 such that the hub portions 172c, 182c capture the bearing assembly 190. Through this engagement, the bearing assembly 190 allows the rotor assembly first parts 172, 182 to rotate with respect to the stator assembly 150. The construction and mounting of the rotor assembly 160 results in the creation of an annular air gap 171, 181 between an end face 176a, 186a of the permanent magnets 176, 186 and the stator assembly 150. The air gaps 171, 181 allow the stator core 150, when an electrical current is applied, to generate a magnetic field that causes the rotation of the rotor assembly 160 via interaction with the permanent magnets 176, 186 without contact occurring between the permanent magnets 176, 186 and the stator assembly 150. As explained further in a later section, the air gaps 171, 181 also form part of a cooling air pathway to enable air-cooling of the stator assembly 150.

The axial flux electric motor 100 further includes an output component 140 mounted to the second rotor part 180, for example by fasteners or bolts. In some examples, the output component 140 can be integrally formed with the second rotor part 180. In one aspect, the rotor part 180 includes an output shaft portion 142 extending from the motor 100. Upon activation of the motor 100, the rotor assembly 160 rotates, thus causing the output shaft 142 to rotate about the longitudinal axis of rotation. The axial flux electric motor 100 further includes a resolver assembly 146 including a output component 146a mounted to the first rotor part 170, for example by fasteners 162. The output component 146a is shown as including a shaft part 146b which is connected to a resolver 146c which provides an input to a controller as to the rotational position of the rotor assembly 160, for example, with respect to the stator assembly 150. The resolver 146c is retained onto the shaft part 146b by a fastener 146d and is axially supported by the first housing part 120. A cover 146e may be provided to protect the resolver assembly 146.

Figure 28:
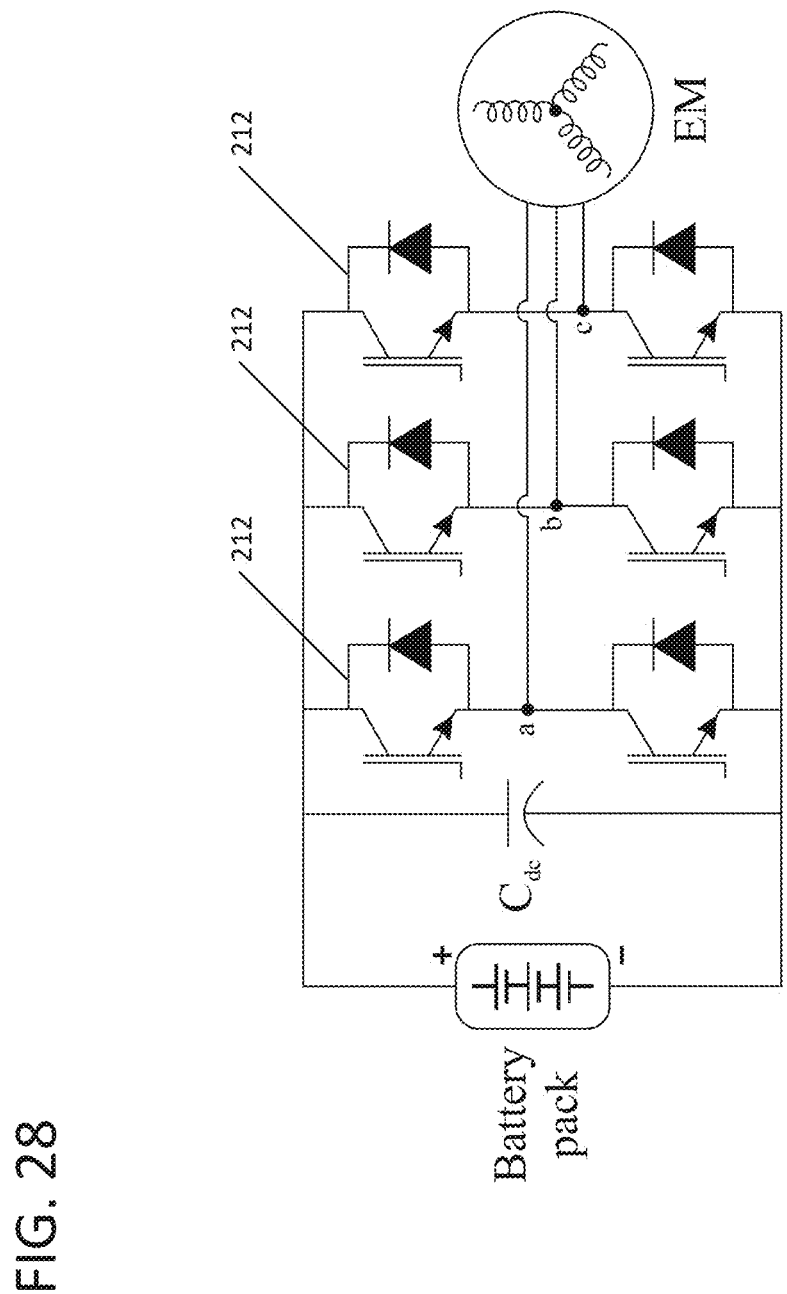
FIG. 28 is a schematic diagram showing how power electronics modules are arranged.

In one aspect, the electric motor 100 can include one or more power electronics modules 212 for delivering and managing power to the electric motor 100. Accordingly, in one aspect, the power electronics modules 212 are in electrical communication with the stator assembly 150. In certain examples, the power electronics modules 212 are mounted to the housing 111. In the particular example shown, the power electronics modules are mounted to the first housing part 110, for example by fasteners or bolts. In the example shown throughout there are three different power electronics modules 212. More or fewer power electronics modules 212 can be provided. FIG. 28 shows a basic schematic showing how the power electronics modules 112 are generally arranged with respect to the electric motor 100.

Liquid Cooling Arrangement

In certain examples, the first housing part 110 is formed with a main body 111 surrounding and in contact with the stator assembly 150. The first housing part 110 may be referred to as a cooling jacket. In one aspect, the first housing part 110 defines and an internal passageway 113 through which a cooling fluid, such as water and/or glycol, can be circulated. In one aspect, the main body 111 includes a plurality of cooling fins 112 extending into regions located circumferentially between the electromagnets 152 of the stator assembly 150. As discussed below, the internal passageway 113 can extend into and/or through the cooling fins 112.

In the example shown, the internal passageway 113 forms an annulus within the main body 111 and thus extends around the entire circumference of the main body 111. The main body 111 is also shown as including an inlet port 114 for allowing the cooling fluid to enter the internal passageway 113 and an outlet port 115 for allowing the cooling fluid to exit the internal passageway. Although the ports 114, 115 are characterized as being inlet and outlet ports, respectively, each port may provide either function. The main body 111 is further shown as including a plurality of additional ports 116 extending into the cooling passageway. When the main body 111 is formed through an additive manufacturing process, the ports 116 allow for additional access into the passageway 113 such that compressed air or another fluid can be introduced into the internal passageway 113 to blow out or clear out debris, such as residual metal powder, out of the internal passageway 113. More or fewer ports 116 and more or fewer locations may be provided. In the example shown, the ports 116 are plugged after the internal passageway 113 has been appropriately cleaned. As the first housing part 110 is in direct physical contact (i.e. in thermal contact) with the stator assembly 150, heat is transferred from the stator assembly 150 to the main body 111 of the first housing part 110, and then to the cooling fluid within the internal passageway 113. The inlet and outlet ports 114, 115 can be connected to, for example, a cooling and circulation system including a pump and a heat exchanger (e.g. refrigeration system, liquid-to-air heat exchanger, etc.). Accordingly, the cooling fluid can be circulating from the outlet port 115, cooled through the heat exchanger, and returned back to the inlet port 114 at a lower temperature whereby the cooling fluid can further extract heat from the stator assembly 150.

As most easily viewed at FIGS. 11 to 22, the main body 111 of the first housing part 110 is an annular ring-shaped component defining an inner circumferential wall surface 111a, an outer circumferential wall surface 111b, and upper and lower wall surfaces 111c, 111d. The internal passageway 113 is formed between the wall surfaces 111a-111d and is proximate or adjacent the inner circumferential wall surface 111a. In one aspect, the internal passageway 113 extends between internal wall surfaces 113a-113d.

In the particular example shown, the internal passageway 113 is divided into multiple passageways by internal rib structures 113e extending between the wall surfaces 113a and 113b. By dividing the internal passageway 113 into multiple passageways, greater heat transfer effectiveness between the cooling fluid and the main body 111 can be obtained as the effective contact surface area between the main body 111 and the cooling fluid is greatly increased due to the surface area of the rib structures 113e. The rib structures 113e can also be arranged to maintain an optimal fluid flow conditions (i.e. decrease laminar flow) that result in increased heat transfer. In one aspect, the internal rib structures 113e extend at an angle a1, in a direction from wall surface 113b to wall surface 113a, that is an oblique angle to the inner surface 111a and to the longitudinal axis X. In the example shown, 14 internal rib structures 113e are provided extending at an angle a1 of about 35 degrees to subdivide the internal passageway 113 into 15 passageways. More or fewer rib structures 113e may be provided at various other angles. In one aspect, providing the rib structures 113e at the angle a1 increases the length and therefore surface area of the rib structures 113e, resulting in greater heat transfer effectiveness. Additionally, when the main body 111 is formed by an additive manufacturing process, such as an aluminum additive manufacturing process, printing the rib structures 113e at the angle a1 allows for an appropriate draft angle to exist such that the rib structures 113e can be appropriately printed without collapsing. Throughout the majority of the circumference of the main body 111, the internal rib structures 113e are parallel to each and to the wall surfaces 111c, 113d, and the inlet/outlet ports 114, 115 are adjacent one another. Accordingly, the cooling fluid enters the internal passageway 113 at one radial location, circulates through the circumferential length of the main body 111, and exits the internal passageway 113 at the same general radial location.

In certain examples, the cooling fins 112 define radial lengths RL, and the cooling fins 112 are tapered such that widths W of the cooling fins 112 gradually reduce in size as the cooling fins 112 extend along their radial lengths RL towards the axis of rotation X. Preferably, the widths W of the cooling fins 112 taper along a majority of the radial lengths RL of the cooling fins 112. In the example depicted, the cooling fins 112 are configured to taper along their entire lengths or along substantially their entire lengths. In certain examples, the cooling fins 112 can have a generally triangular cross-sectional shape when cut along a cross-section line perpendicular to the axis of rotation X.

It will be appreciated that the cooling fins 112 can include base ends 112a integral with the main body 111 and free ends 112b spaced radially inwardly with respect to the base ends 112a. The cooling fins 112 have widths W that taper inwardly as the cooling fins 112 extend from the base ends 112a to the free ends 112b.

In certain examples, the internal passageway 113 can be configured to allow for flow of the cooling liquid to be exposed to the one or more power electronics modules 212 such that the power electronics modules 112 can also be cooled by the cooling fluid. With such an arrangement, a common cooling loop and common structure for the heat extraction of the machine and the power electronics 212 (e.g. power electronics modules 212) is realized. Instead of having separate cold plates or heat sinks for each of these components, these components are arranged onto the same physical structure, through which a common cooling fluid flows, to minimize weight and optimize heat extraction capability.

Figure 22:
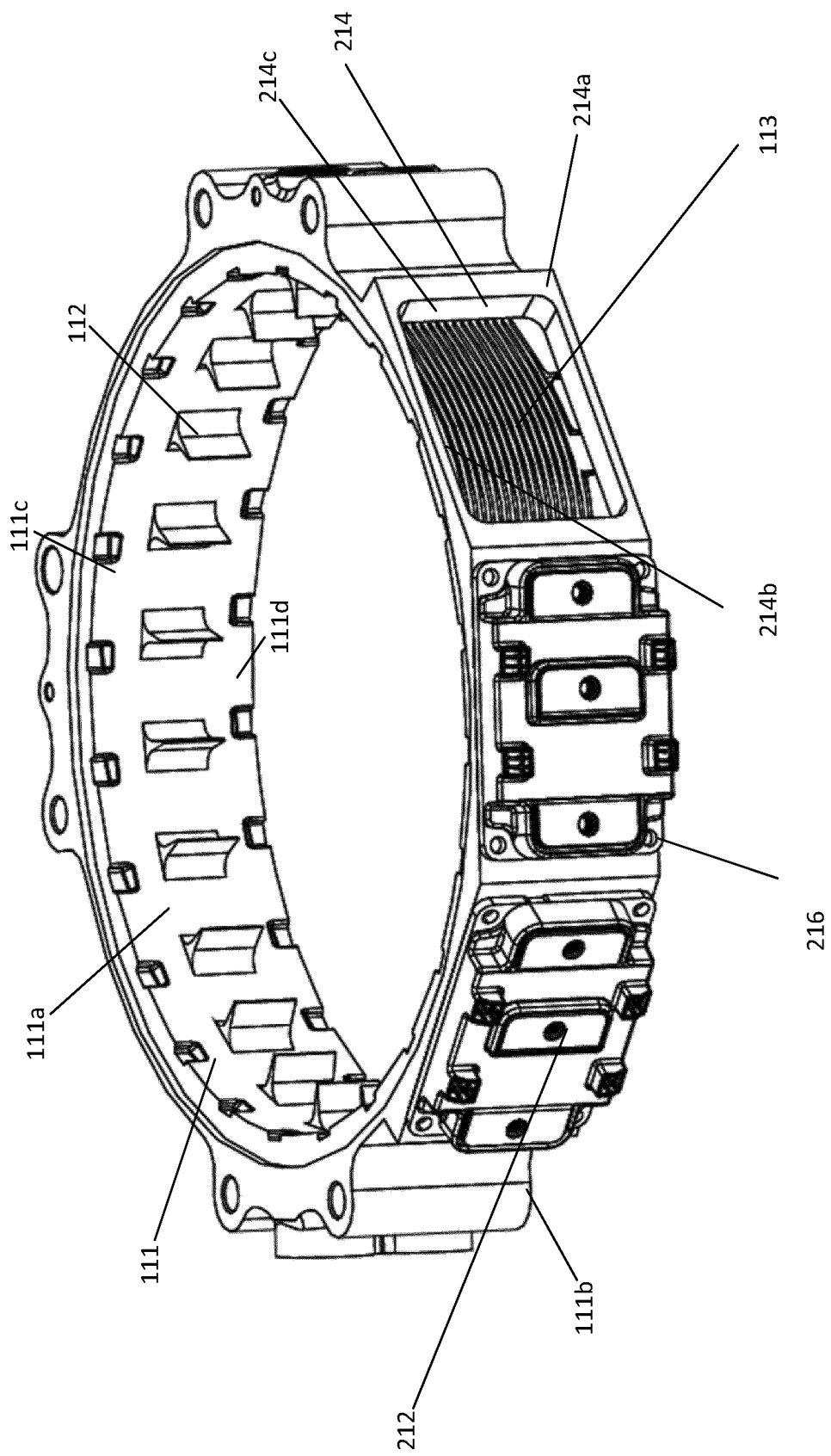
FIG. 22 is a sixth view of the first housing part of FIG. 11 with a power electronics module removed.
Figure 23:
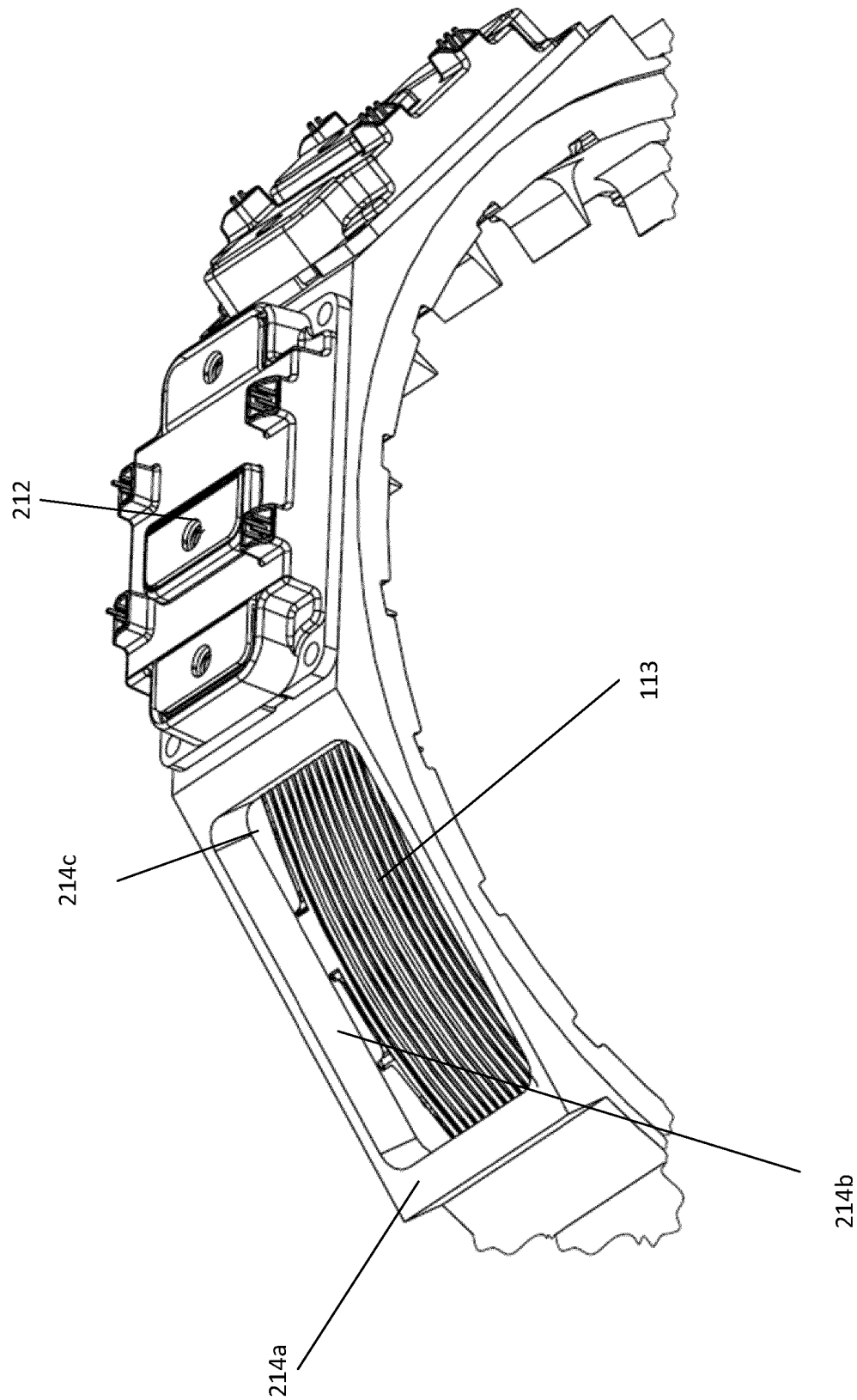
FIG. 23 is a close of view of FIG. 22.
Figure 24:
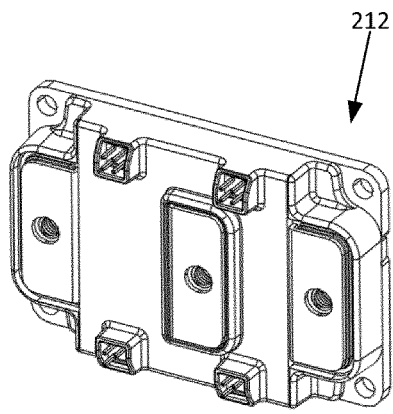
FIG. 24 is an isometric view of a power electronics module shown in isolation.
Figure 25:
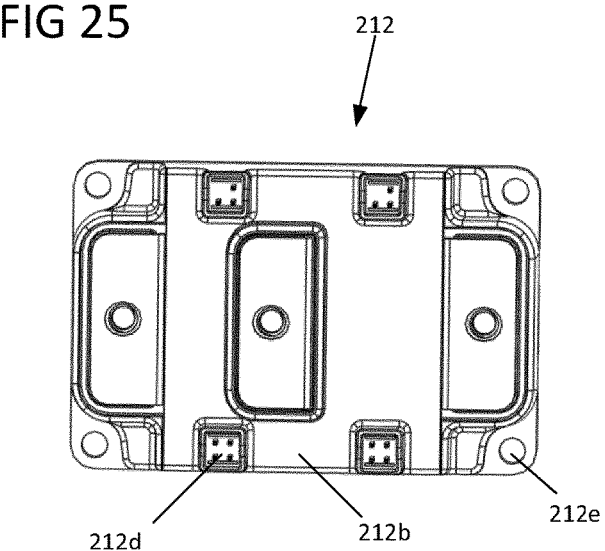
FIG. 25 is a front view of the power electronics module of FIG. 24.
Figure 26:
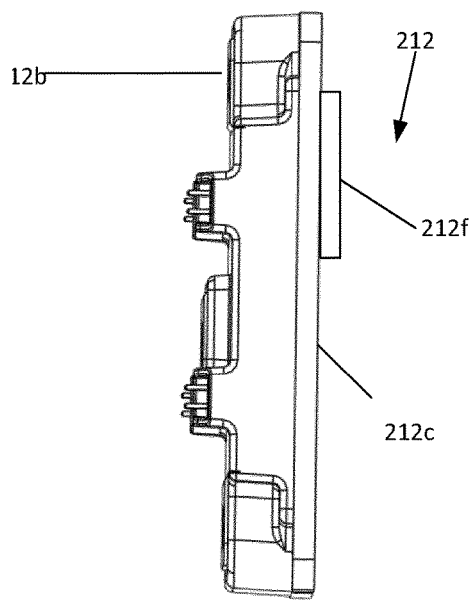
FIG. 26 is a side view of the power electronics module of FIG. 24.
Figure 27:
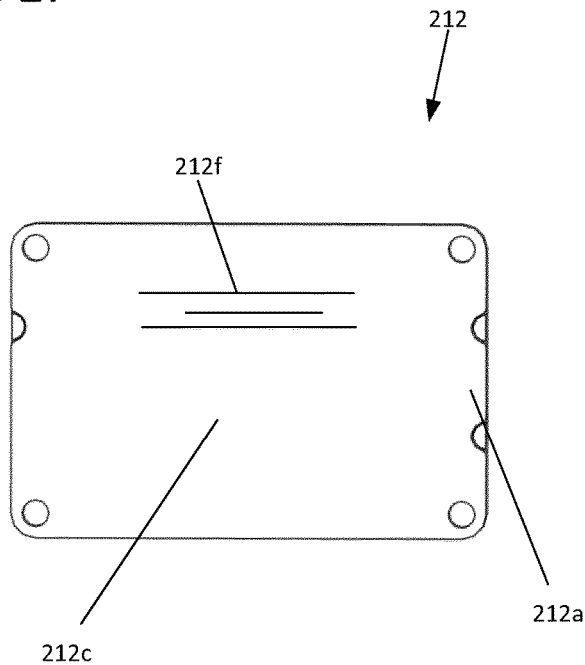
FIG. 27 is a rear view of the power electronics module of FIG. 24.

As shown, the first housing part 110 includes a plurality of mounting pads 214, shown in FIGS. 22 and 23, each of which is configured to receive an individual power electronics module 212. As shown, each mounting pad 114 is defined by an outer wall 214a and a perimeter wall 214a extending from the outer wall 214a towards the inner surface 111a of the first housing part 110 and into the internal passageways 113 such that an interior volume 214c of the mounting pad 114 is defined. With such a configuration, the interior volume 214c of each mounting pad 214 is in fluid communication with the internal passageway 113 such that when a power electronics module 212 is mounted to the mounting pad 114, and thereby exposed to the internal passageway 113, the power electronics module 212 is directly exposed to the cooling fluid flowing through the internal passageway 113. In the example shown, the mounting pads 214 are spaced apart and circumferentially arranged about the outer circumferential wall surface 111b such that a single mounting pad 214 is provided for each power electronics module 212. In the example shown, three mounting pads 214 are provided. Other configurations are possible.

In one aspect, each mounting pad 214 is dimensioned to allow for a power electronics module 212 to be attached to the first housing part 110 such that a flange portion 212a of the power electronics module 212 rests against the top wall 214a of the mounting pad 214. A gasket or other type of sealing structure can be provided between the flange portion 212a and the top wall 214a such that a fluid-tight connection is formed between the power electronics modules 212 and the mounting pads 214. In one aspect, the top wall 214a of each mounting pad 214 is generally orthogonal to a line passing through the longitudinal axis X and the midpoint of the top wall 214a. In one aspect, the perimeter wall 214b has a generally rectangular shape. In one aspect, the perimeter wall 214b has long sides running parallel to the upper and lower wall surfaces 111c, 111d of the first housing part 110 and short sides running orthogonally to the top sides. For additional cooling the power electronics module 212 can have a cooling plate attached. The cooling plate would additionally be in fluid communication with the cooling fluid flowing through the cooling jacket. It is noted that other shapes for the perimeter wall 214b are possible.

The use of a power electronics module 212 is also applicable to a flooded stator where the cooling jacket is replaced with a flooded housing. Due to the power electronics 212 module being in fluid communication with the cooling fluid of either the stator or the cooling jacket the various components will need to be sealed.

The disclosed configuration of the first housing part 110 incorporating mounting pads 114 for the power electronics modules 212 has several advantages. For example, the weight of the overall housing main body 111 can be minimized because there are distinct material cut-outs to mount the modules 212. Additionally, there is no need for separate heat-sinks or cold-plates for the modules 212, thus saving weight. The power electronics modules (electronics) 212 are in direct contact with the cooling fluid, thus minimizing additional inefficiencies that can occur by introducing more material layers.

FIGS. 24 through 27 show the power electronics modules 212 in isolation. The power electronics modules 212 each include a first and a second sides 212*b*, 212*c*. The first side 212*b* includes power and communication ports 212*d*, and related components. The second side 212*c* includes the flange 212*a* along with holes 212*e* which allow for fasteners to attach the power electronics modules 212 to the main housing 111. In some examples, the second side 212*c* is provided with an entirely smooth surface that is exposed to the cooling fluid. In some examples, the second side 212*c* is provided with additional elements for increasing the surface area of the second side 212*c* to transferring heat from the cooling fluid to the module 212. For example, the second side 212*c* can be provided with a plurality of fins 212*f* that project from the second side 212*c* and into the interior volume 214*c* defined in the first housing part 110.

In certain examples, the main body 111 has an inner diameter and an outer diameter, and the cooling fins 112 have radial lengths RL that are less than 10, 15 or 20% as long as the inner diameter of the cooling jacket. In certain examples, the stator assembly 150 has an axial dimension H1 and the cooling fins 112 each have an axial dimension H2 that is less than 50% as long as the first axial dimension A1 of the stator assembly 150.

Controller

It will be appreciated that a controller can be used to control operation of the electric motor 100, for example, via the power modules 212. The controller can include one or more processors. The processors can interface with software, firmware and/or hardware. Additionally, the processors can include digital or analog processing capabilities and can interface with memory (e.g., random access memory, read-only memory, or other data storage). In certain examples, the processors can include a programmable logic controller, one or more microprocessors, or like structures. The processors can interface with sensors such as rotary encoders, such as the resolver 146, that detect the rotational position of the rotor assembly 160 relative to the stator assembly 150. Based on the sensed rotational position of the rotor assembly 160, the controller can alternate the direction of electrical current provided to the electromagnets 152 of the stator assembly 150 such that magnetic attraction/repulsion between the electromagnets 152 of the stator assembly 150 and the permanent magnets 176, 186 of the rotor assembly 160 causes the rotor assembly 160 and the shaft 142 connected thereto to rotate about the axis of rotation X relative to the stator assembly 150.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

We claim:

1. An electric motor assembly comprising:
    a) a motor shaft, a stator assembly, and a rotor assembly; and
    b) a cooling jacket surrounding the stator assembly, the cooling jacket including:
        (i) an inner wall facing radially inwardly towards the stator assembly and an opposite outer wall facing radially outwardly;
        (ii) a circumferential internal fluid passageway for allowing a cooling fluid to be pumped through an interior of the cooling jacket, the internal fluid passageway being disposed between the inner and outer walls and extending between an inlet and an outlet;
        (iii) a mounting pad defining an opening in the outer wall; and
        (iv) a heat generating component associated with the motor assembly, the heat generating component being mounted to cover the opening such that the heat generating component is in direct fluid communication with the internal fluid passageway such that the cooling fluid can provide cooling to the heat generating component.

2. The electric motor assembly of claim 1, wherein the mounting pad includes a plurality of mounting pads, each receiving a heat generating component.

3. The electric motor assembly of claim 1, wherein the heat generating component is a power electronics module.

4. The electric motor assembly of claim 1, wherein the mounting pad includes a top wall and a perimeter wall extending from the top wall to the internal fluid passageway.

5. The electric motor assembly of claim 4, wherein the perimeter wall is generally rectangular shaped.

6. The electric motor assembly of claim 5, wherein the perimeter wall has long sides running parallel to a top side and a bottom side of the cooling jacket and short sides running orthogonal to the long sides.

7. The electric motor assembly of claim 6, wherein the mounting pad includes a plurality of mounting pads arranged such that a short end of the perimeter wall of one mounting pad is proximate the short end of the perimeter wall of another mounting pad.

8. The electric motor assembly of claim 1, wherein the electric motor assembly includes an axial flux electric motor assembly.

9. A cooling jacket for cooling a stator assembly of a motor assembly and at least one heat generating component of a motor assembly, the cooling jacket comprising:
    a) an inner wall configured to face radially inwardly towards the stator assembly and an opposite outer wall facing radially outwardly;
    b) a circumferential internal fluid passageway for allowing a cooling fluid to be pumped through an interior of the cooling jacket, the internal fluid passageway being disposed between the inner and outer walls and extending between an inlet and an outlet;
    c) a mounting pad defining an opening in the outer wall; and
    d) the at least one heat generating component mounted to cover the opening such that the heat generating component is in direct fluid communication with the internal fluid passageway such that the cooling fluid can provide cooling to the heat generating component.

10. The cooling jacket of claim 9, wherein the mounting pad includes a plurality of mounting pads, each configured for receiving a heat generating component.

11. The cooling jacket of claim 9, wherein the mounting pad includes a top wall and a perimeter wall extending from the top wall to the internal fluid passageway.

12. The cooling jacket of claim 11, wherein the perimeter wall is generally rectangular shaped.

13. The cooling jacket of claim 12, wherein the perimeter wall has long sides running parallel to a top side and a bottom side of the cooling jacket and short sides running orthogonal to the long sides.

14. An electric motor assembly comprising:
    a) a motor shaft, a stator assembly, and a rotor assembly; and b) a cooling structure surrounding the stator assembly and retaining a cooling fluid in thermal communication with the stator assembly; the cooling structure including an outer wall and a mounting pad defining an opening in the outer wall, and a heat generating component associated with the motor assembly, the heat generating component covering the opening such that the heat generating component is in direct fluid communication with the cooling fluid such that the cooling fluid can provide cooling to the heat generating component.

15. The electric motor assembly of claim 14, wherein the stator assembly is a flooded stator assembly such that the cooling fluid is in direct contact with the stator assembly.

16. The electric motor assembly of claim 14, wherein the mounting pad includes a plurality of mounting pads, each configured for receiving a heat generating component.

17. The electric motor assembly of claim 14, wherein the mounting pad includes a top wall and a perimeter wall extending from the top wall to an internal fluid passageway of the cooling structure retaining the cooling fluid.

18. The electric motor assembly of claim 14, wherein the cooling structure is a cooling jacket including:
(i) an inner wall facing radially inwardly towards the stator assembly and an opposite outer wall facing radially outwardly; and
(ii) a circumferential internal fluid passageway for allowing a cooling fluid to be pumped through an interior of the cooling jacket, the internal fluid passageway being disposed between the inner and outer walls and extending between an inlet and an outlet;
iii) wherein the mounting pad opening is in fluid communication with the circumferential internal fluid passageway.

19. The electric motor assembly of claim 14, wherein the heat generating component is a power electronics module and is provided with cooling fins extending into the mounting pad opening.

20. The electric motor assembly of claim 14, wherein the electric motor assembly is an axial flux electric motor assembly.

* * * * *